US008851732B2

(12) United States Patent
Lee et al.

(10) Patent No.: US 8,851,732 B2
(45) Date of Patent: Oct. 7, 2014

(54) LIGHT-GUIDE MODULE, METHOD OF MANUFACTURING THE SAME AND BACKLIGHT ASSEMBLY HAVING THE SAME

(75) Inventors: Tae-Ho Lee, Seoul (KR); Sang-Won Lee, Incheon (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 146 days.

(21) Appl. No.: 13/039,009

(22) Filed: Mar. 2, 2011

(65) Prior Publication Data

US 2012/0063171 A1    Mar. 15, 2012

(30) Foreign Application Priority Data

Sep. 10, 2010  (KR) .................. 10-2010-0088658

(51) Int. Cl.
*F21V 7/04* (2006.01)
*F21V 8/00* (2006.01)

(52) U.S. Cl.
CPC ............ *G02B 6/0025* (2013.01); *G02B 6/0053* (2013.01); *G02B 6/0065* (2013.01)
USPC .......................................... 362/608; 362/627

(58) Field of Classification Search
CPC .... G02B 6/002; G02B 6/0016; G02B 6/0018; G02B 6/0073; G02F 1/133615
USPC .............. 362/608, 610–613, 627; 385/31
See application file for complete search history.

(56) References Cited

U.S. PATENT DOCUMENTS

| | | | |
|---|---|---|---|
| 5,598,280 A * | 1/1997 | Nishio et al. ................. 349/57 |
| 6,036,328 A * | 3/2000 | Ohtsuki et al. ............... 362/612 |
| 7,290,917 B2 * | 11/2007 | Cho et al. ..................... 362/616 |
| 7,357,557 B2 * | 4/2008 | Miyashita ..................... 362/615 |
| 7,587,117 B2 * | 9/2009 | Winston et al. ............... 385/146 |
| 2002/0172031 A1 * | 11/2002 | Masuda ......................... 362/31 |
| 2003/0165060 A1 * | 9/2003 | Ouderkirk et al. ............ 362/297 |
| 2004/0130882 A1 * | 7/2004 | Hara et al. ..................... 362/31 |
| 2004/0184258 A1 * | 9/2004 | Sung ............................. 362/31 |
| 2007/0085942 A1 * | 4/2007 | Guo et al. ..................... 349/61 |
| 2008/0074901 A1 * | 3/2008 | David et al. ................... 362/612 |
| 2008/0111946 A1 * | 5/2008 | Lee et al. ...................... 349/62 |
| 2008/0137004 A1 * | 6/2008 | Iwasaki et al. ................. 349/64 |
| 2009/0316430 A1 * | 12/2009 | Chuang et al. ............... 362/606 |
| 2010/0309682 A1 * | 12/2010 | Shiau et al. ................... 362/607 |

FOREIGN PATENT DOCUMENTS

| | | |
|---|---|---|
| JP | 2001-325821 | 11/2001 |
| JP | 2004-079461 | 3/2004 |
| KR | 1020080042314 | 5/2008 |

* cited by examiner

*Primary Examiner* — Julie Bannan
(74) *Attorney, Agent, or Firm* — F. Chau & Associates, LLC

(57) ABSTRACT

In a light-guide module, a method of manufacturing the light-guide module and a backlight assembly having the light-guide module, the light-guide module includes a light-guide plate ("LGP") and a thin-film layer. The LGP has a light-incident surface into which lights are incident and a light-exiting surface through which lights exit. The thin-film layer is formed on the LGP. The thin-film layer has a concavo-convex pattern formed on an opposite surface of a surface contacting the LGP. Accordingly, a thin-film layer having a concavo-convex pattern is formed on a light-incident surface of an LGP, so that a reflectance of light incident into the LGP may be decreased. Moreover, a light amount transmitted through the LGP is increased in accordance with a decreasing of reflectance, so that a light transmittance may be increased in total.

9 Claims, 8 Drawing Sheets

LIGHT-GUIDE MODULE, METHOD OF MANUFACTURING THE SAME AND BACKLIGHT ASSEMBLY HAVING THE SAME

CROSS-REFERENCE TO RELATED APPLICATION

This application claims priority under 35 U.S.C. §119 to Korean Patent Application No. 2010-88658, filed on Sep. 10, 2010 in the Korean Intellectual Property Office (KIPO), the contents of which are herein incorporated by reference in their entirety.

BACKGROUND

1. Technical Field

Exemplary embodiments of the present invention relate to a light-guide module, a method of manufacturing the light-guide module, and a backlight assembly having the light-guide module. More particularly, exemplary embodiments of the present invention relate to a light-guide module that reduces light reflection at a light-incident surface thereof, a method of manufacturing the light-guide module, and a backlight assembly having the light-guide module.

2. Discussion of the Related Art

Generally, a liquid crystal display ("LCD") device includes an LCD panel displaying images and a backlight assembly providing light to the LCD panel.

The backlight assembly may generate light by using various light sources. When the LCD device is used in a small-sized electronic device, such as a mobile terminal, a digital camera, a multi-media player, etc., the backlight assembly may use light-emitting diodes ("LEDs") as a light source.

The backlight assembly further includes a light-guide plate ("LGP"). The LEDs are disposed at a light-incident surface of the LGP. The LGP guides light emitted from the LED to the LCD panel. The number of the LEDs may vary with the size of the LGP.

A demand for thin, lightweight, and cost-saving backlight assemblies called for a decrease in thickness of LGPs and number of LEDs used.

However, the LGP of reduced thickness may increase light leakage from the LGP, thus degrading luminance of the backlight assembly.

SUMMARY

Exemplary embodiments of the present invention provide a light-guide module capable of enhancing a light efficiency by reducing a reflection of light, a method of manufacturing the light-guide module, and a backlight assembly having the light-guide module.

According to an exemplary embodiment of the present invention, a light-guide module includes a light-guide plate ("LGP") and a thin-film layer. The LGP has a light-incident surface into which lights are incident and a light-exiting surface through which the incident lights exit. The thin-film layer is formed on the LGP. The thin-film layer has a concavo-convex pattern formed on an opposite surface of a surface contacting to the LGP.

According to an exemplary embodiment of the present invention, the thin-film layer may have an average refractive index of about 1.22 to about 1.23, and may have a thickness of about 110 nm to about 170 nm.

According to an exemplary embodiment of the present invention, a cross-section surface of the concavo-convex pattern may be a sine wave shape to have a period of about 200 nm to about 300 nm.

According to an exemplary embodiment of the present invention, the thin-film layer may be formed on the light-incident surface.

According to an exemplary embodiment of the present invention, the thin-film layer may be respectively formed on the light-incident surface and the light-exiting surface.

According to an exemplary embodiment of the present invention, the light-exiting surface may be extended from the light-incident surface, and may be substantially perpendicular to the light-incident surface.

According to an exemplary embodiment of the present invention, the thin-film layer may include colloidal silica (SiO2).

According to an exemplary embodiment of the present invention, there is provided a method of manufacturing a light-guide module. In the method, a thin film is coated on a first surface of a light-guide plate ("LGP") to form a thin-film layer. A mold on which a pattern corresponding to a concavo-convex pattern is formed is compressed on the thin-film layer. The thin-film layer compressed on the mold is light-cured. The mole is separated from the thin-film layer.

According to an exemplary embodiment of the present invention, when a surface on which the thin film is coated may be a light-incident surface of the LGP, a step of coating the thin film on a light-incident surface of the LGP includes arranging plural LGPs so that light-incident surfaces of the LGPs are arranged toward an identical direction, and simultaneously coating the thin film on the light-incident surfaces of the arranged LGPs.

According to an exemplary embodiment of the present invention, a surface on which the thin film is coated may be a light-incident surface of the LGP into which lights are incident and a light-exiting surface of the LGP through which lights exit.

According to an exemplary embodiment of the present invention, a backlight assembly includes a light source, a light-guide plate ("LGP"), a thin-film layer and a receiving container. The LGP is adjacent to the light source. The LGP includes a light-incident surface into which lights are incident and a light-exiting surface through which lights exit. The thin-film layer is formed on the LGP. The thin-film layer has a concavo-convex pattern formed on an opposite surface of a surface contacting the LGP. The receiving container is disposed below the LGP to receive the light source, the LGP and the thin-film layer.

According to an exemplary embodiment of the present invention, the light source may include a plurality of light-emitting diodes.

According to an exemplary embodiment of the present invention, the light source may be positioned at a side surface of the LGP.

According to an exemplary embodiment of the present invention, light transmittance of the LGP is enhanced by decreasing light reflected from the LGP, so that an amount of light exiting from the LGP is increased to enhance luminance characteristics of the backlight assembly.

BRIEF DESCRIPTION OF THE DRAWINGS

The embodiments of the present invention will become more apparent by reference to the following detailed description when considered in conjunction with the accompanying drawings, in which.

DETAILED DESCRIPTION

Hereinafter, exemplary embodiments of the present invention will be described in detail with reference to the accompanying drawings, wherein the same numbers may refer to the same or substantially the same elements throughout the drawings and the specification.

Figure 1:
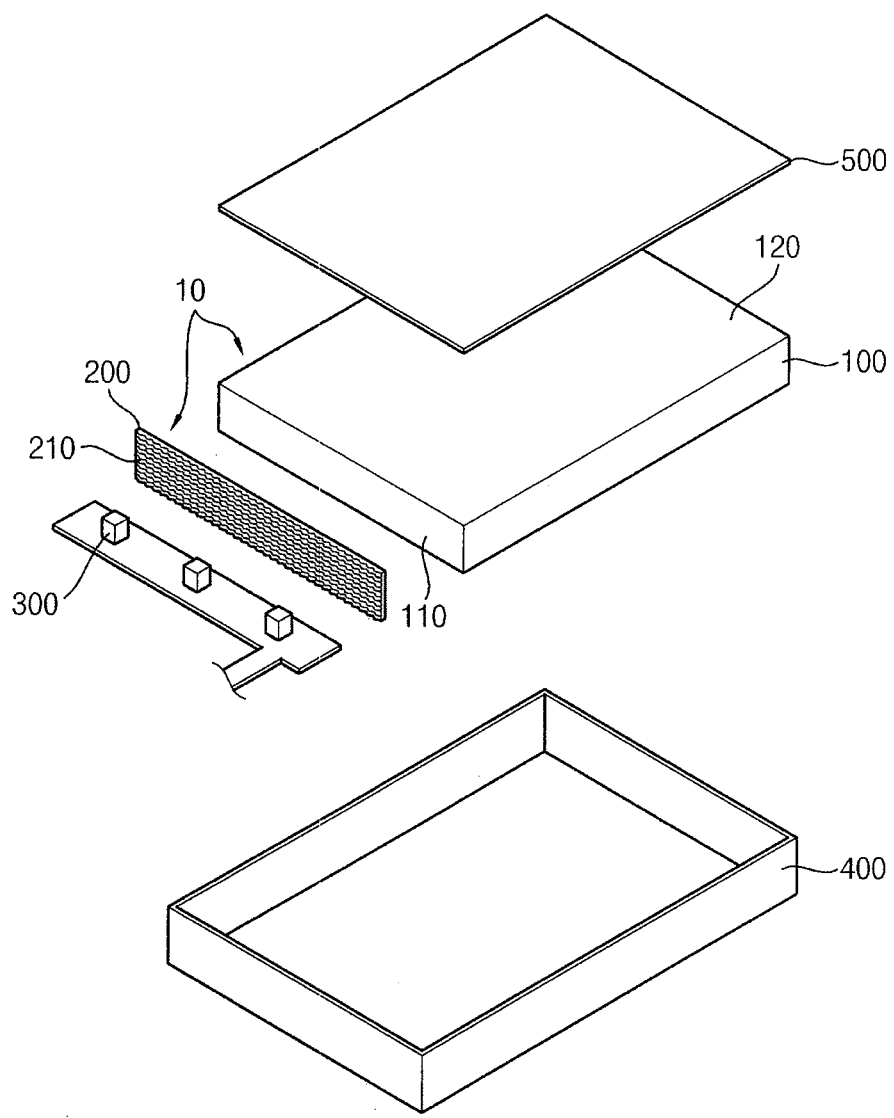
FIG. 1 is an exploded perspective view schematically showing a backlight assembly according to an exemplary embodiment of the present invention.
Figure 2:
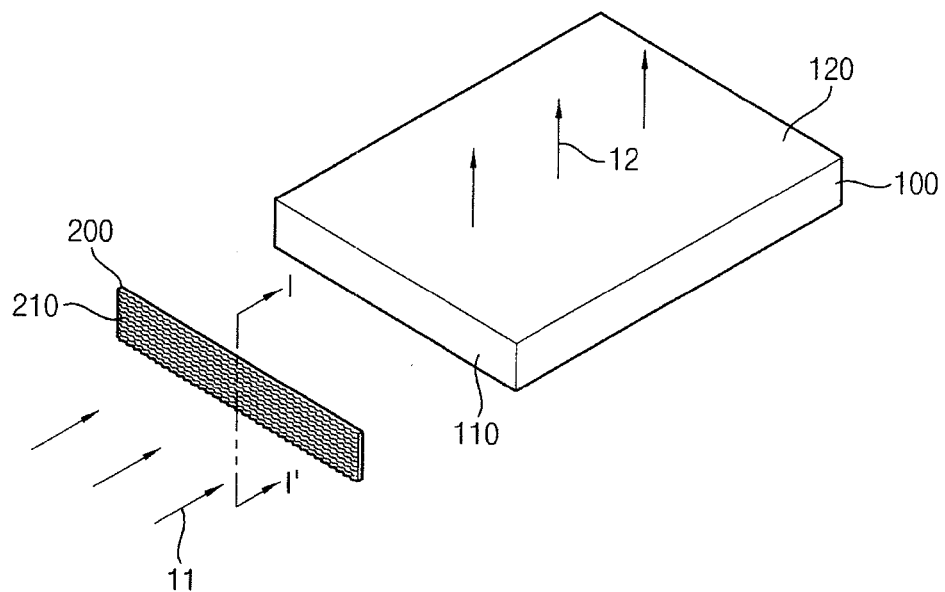
FIG. 2 is an exploded perspective view schematically showing a light-guide module of FIG. 1.
Figure 3:
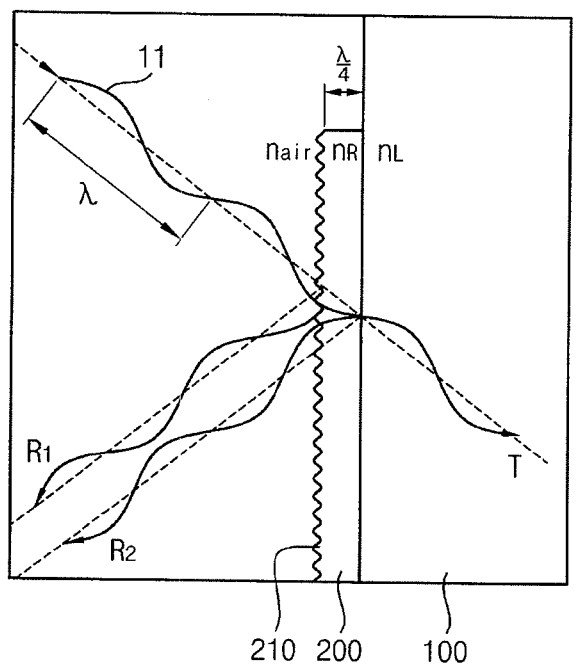
FIG. 3 is a cross-sectional view showing a portion taken along a line I-I' of FIG. 2.

FIG. 1 is an exploded perspective view schematically showing a backlight assembly according to an exemplary embodiment of the present invention. FIG. 2 is an exploded perspective view schematically showing the light-guide module of FIG. 1. FIG. 3 is a cross-sectional view showing a portion taken along a line I-I' of FIG. 2.

Referring to FIGS. 1 to 3, a backlight assembly according to an exemplary embodiment of the present invention includes a light source 300, a light-guide module 10, and a receiving container 400. The light-guide module 10 includes a light-guide plate ("LGP") 100 and a first thin-film layer 200 formed on a light-incident surface of the LGP 100. The backlight assembly further includes an optical sheet 500. A plurality of optical sheets may be included in the backlight assembly.

The light source 300 includes a plurality of light-emitting diodes ("LEDs") that generate light using external driving power. The LEDs generate point light having directivity along one direction. That is, the LEDs generate light approximately spreading from a point. The backlight assembly further includes a light source driving film (not shown) that is electrically connected to a first surface of the LEDs to apply power to the LEDs. The light source driving film may be a flexible printed circuit board ("FPCB").

The LGP 100 converts incident light 11 having an optical distribution of a point light source or a line light source into exiting light 12 having an optical distribution of a surface light source. The LGP 100 includes a light-incident surface 110 and a light-exiting surface 120. The light-incident surface 110 is formed on a first side of the LGP 100 to receive incident light. The light source 300 (i.e., the LEDs) is disposed at the light-incident surface 110. The light-exiting surface 120 is extended from an upper portion of the light-incident surface 110 to exit light. For example, the light-exiting surface 120 is substantially perpendicular to the light-incident surface 110.

A first thin-film layer 200 is formed on the light-incident surface. The first thin-film layer 200 has a concavo-convex pattern 210 on a surface opposite to the light source 300.

The receiving container 400 has a rectangular frame shape. The receiving container 400 receives the light source 300 and the light-guide module 10.

The optical sheet(s) 500 is disposed on an upper portion of the light-exiting surface 120. The optical sheet(s) 500 may enhance luminance characteristics of light exiting through the light-exiting surface.

Hereinafter, the light-guide module 10 will be described in detail.

The light-guide module 10 includes the LGP 100 and the first thin-film layer 200 formed on the light-incident surface of the LGP 100.

The first thin-film layer 200 is formed on the light-incident surface of the LGP 100. According to an exemplary embodiment, the first thin-film layer 200 may have colloidal silica ($SiO_2$). The first thin-layer 200 has a refractive index $n_R$ that is greater than a refractive index $n_{air}$ of air and is smaller than a refractive index $n_L$ of the LGP 100. The refractive index $n_{air}$ is about 1, and the refractive index $n_L$ of the LGP 100 may be about 1.4 to about 1.5. For example, when the LGP 100 has is polymethyl methacrylate, the refractive index of the LGP 100 is about 1.49.

When the first thin-film layer 200 is formed on the light-incident surface of the LGP 100, an incident pattern of incident light is different from an incident pattern when the first thin-film layer is not formed.

For example, light emitted from the light source is partially refracted and partially reflected while passing through a medium having a different refractive index. For example, the incident light 11 is partially refracted and partially reflected by the first thin-film layer 200 while passing through the first thin-film layer 200. The refracted incident light having passed through the first thin-film layer 200 is again partially refracted and partially reflected by the light-incident surface 110.

A light beam R1 reflected by the first thin-film layer 200 and a light beam R2 reflected by the light-incident surface 110 of the LGP overlap with each other in accordance with phases and periods thereof and constructively or destructively interfere with each other. When the light beams R1 and R2 have the opposite phases from each other, the light beams R1 and R2 may cancel each other out. Thus, when a thin-film layer is formed between mediums having different refractive indexes, light beams reflected by the mediums and the thin-film layer among incident light beams cancel out each other by destructive interference, thus decreasing reflectance of the overall incident light beams. The reduced reflectance may lead to an increase in the amount of light that is transmitted through the mediums. Moreover, newly incoming light beams from the light source interfere less with the reflected light beams, thereby resulting in an increase in total transmittance of incident light from the light source. A refractive index of the thin-film layer for minimizing reflected light may be obtained by using the following equations.

When a light beam passes through mediums having different refractive indexes, a reflection coefficient 'A' of a light beam reflected at a boundary surface between the mediums may be obtained by the following Equation 1:

$$A = \frac{n_0 - n_1}{n_0 + n_1} \quad \text{[Equation 1]}$$

When a light beam is incident from air to an LGP, n0 denotes a refractive index of air, and n1 denotes a refractive index of the LGP.

When a light beam is incident from a first medium having a first refractive index into a second medium having a second refractive index larger than the first refractive index, a phase of a light beam, which is reflected at a boundary between the first medium and the second medium, is opposite to a phase of the incident light beam. When a light beam sequentially passes through three mediums having sequentially increasing refractive indexes, light beams reflected at boundary surfaces between the mediums interfere with each other. A relationship between the refractive indexes of the three mediums for minimizing reflection is represented by the following Equation 2. It is assumed in Equation 2 that a wavelength of light is $\lambda$ and a thickness of the first thin-film layer 200 is $\lambda/4$.

$$\frac{n_{air} - n_R}{n_{air} + n_R} = \frac{n_R - n_L}{n_R + n_L} \quad \text{[Equation 2]}$$

$$\therefore n_R = \sqrt{(n_{air} \times n_L)}$$

Here, $n_{air}$ denotes a refractive index of air, $n_L$ denotes a refractive index of the light-guide plate 100, and $n_R$ denotes a refractive index of the first thin-film layer 200.

It is assumed that a wavelength $\lambda$ of incident light is about 550 nm that is a middle wavelength of visible light. When the refractive index of air is about 1 and a refractive index of the LGP 100 is about 1.49, the refractive index $n_R$ of the first thin-film layer 200 where interference between reflected light beams occurs may be obtained by using Equation 2. The refractive index $n_R$ of the first thin-film layer 200 satisfying Equation 2 is about 1.225.

Thus, when the refractive index of the first thin-film layer 200 is about 1.225, the interference between the reflected light beams may be maximized. Thus, reflectance of the incident light may be decreased, and an efficiency of the LGP 100 may be maximized.

According to an exemplary embodiment, it is assumed that a reflection coefficient of a light beam reflected by the first thin-film layer 200 is A1 and a reflection coefficient of a light beam reflected by the LGP 100 is A2. When a refractive index of the first thin-film layer 200 is about 1.225, A1=0.101123 and A2=0.097605 by Equation 1. A reflected intensity "I" corresponding to the amount of reflected light may be obtained by Equation 3:

$$I = A^2 \quad \text{[Equation 3]}$$

When the first thin-film layer 200 is formed on the light-incident surface 110, a reflected light beam has an opposite phase from a phase of an incident light beam so that a reflection coefficient has a negative value. Thus, the whole amount of reflected light except for light reflected at boundary surfaces between mediums to interfere with each other may be obtained by the following Equation 4:

$$I_{tot} = (A_1 - A_2)^2 \quad \text{[Equation 4]}$$

in the case of having an intermediate thin-film layer.

When the first thin-film layer 200 is formed on the LGP, a reflection amount $I_{tot}$ obtained by Equation 4 is about 0.0000123. The light-guide module 10 with the first thin-film layer 200 has a reflectance of about 0.00123%. When the first thin-film layer 200 is not formed on the LGP, a reflection amount obtained by Equation 1 and Equation 3 is about 0.038725. A light-guide module without the first thin-film layer 200 has a reflectance of about 3.87%. As a result, the light-guide module 10 according to an exemplary embodiment may enhance reflectance by about 3.8% in comparison with a light-guide module without the first thin-film layer 200. The following Table 1 shows light reflectance of a light-guide module with the first thin-film layer and a light-guide module with no intermediate thin-film layer:

TABLE 1

| Light reflectance without intermediate thin-film layer | | 3.87% |
|---|---|---|
| Light reflectance with the first thin-film layer (wherein, thickness of first thin-film layer is $\lambda/4$, and refractive index $n_R$ of first thin-film layer is 1.225) | Green | 0.00123% |
| | Blue | 0.001384% |
| | Red | 0.001384% |

A transmittance of light passing through the first thin-film layer 200 is obtained by using the above values. When the amount of incident light is 1, a light transmittance may be obtained by subtracting a reflection amount from 1. When the light-guide module does not have the first thin-film layer 200, a light transmittance may be obtained by subtracting the reflection amount of 0.038725 from 1. Since a transmittance amount is about 0.9613 when the light-guide module does not have the first thin-film layer 200, a light transmittance is about 96.13%. According to an exemplary embodiment, when the light-guide module has the first thin-film layer 200, a light transmittance may be obtained by subtracting the $I_{tot}$ from 1, as described in the following Equation 5:

$$TRM = 1 - (A_1 - A_2)^2 \quad \text{[Equation 5]}$$

Here, TRM is a light transmittance amount.

According to an exemplary embodiment, a transmittance amount of light, which is obtained by Equation 5, is about 0.998, and a light transmittance is about 99.8%. When the light-guide module does not have the first thin-film layer 200, a light transmittance is about 96%. The light transmittance of about 99.8% is obtained when the thickness of the first thin-film layer 200 is $\lambda/4$ and a refractive index of the first thin-film layer 200 is about 1.225. When there is no interference between light beams and the light-guide module has the first thin-film layer, a light transmittance is obtained by the following Equation 6:

$$TRM = (1 - A_1^2) - (1 - A_2^2) \quad \text{[Equation 6]}$$

When the first thin-layer 200 is formed on the LGP, a light transmittance obtained by Equation 6 is about 0.9803. A light transmittance is enhanced in comparison with when the first thin-film layer 200 is not formed on the LGP. According to an exemplary embodiment, the total reflectance is minimized since reflected beams destructively interfere with each other, thus enhancing light transmittance, as can be seen from the resultant values of Equation 5. When a thickness of the first thin-film layer 200 is $\lambda/4$ and a refractive index of the first thin-film layer 200 is about 1.225, the has the maximum light transmittance. The following Table 2 shows obtained light transmittances.

TABLE 2

| Light transmittance without intermediate thin-film layer | 96.13% |
|---|---|
| Light transmittance with first thin-film layer (wherein, thickness of first thin-film layer is $\lambda/4$, and refractive index of first thin-film layer ($n_R$) is 1.225) | 99.8% |

Hereinafter, a method for forming the first thin-film layer 200 having a refractive index of about 1.225 will be described.

Generally, a refractive index of colloidal silica ($SiO_2$) is about 1.4. The concavo-convex pattern 210 is formed on a light-incident surface of the thin-film layer 200 to change a refractive pattern of light, thereby adjusting an average refractive index of the first thin-film layer 200. A uniform concavo-convex pattern 210 is formed on a first surface of the first thin-film layer 200 to decrease an average refractive index of the first thin-film layer 200 to about 1.225.

The first thin-film layer 200 has the concavo-convex pattern 210 on a surface facing the light source 300. The first thin-film layer 200 may decrease an average refractive index due to the concavo-convex pattern 210. The average refractive index $n_{eff}$ of the first thin-film layer 200 is smaller than a refractive index $n_R$ of the first thin-film layer 200 that does not have the concavo-convex pattern. The average refractive index $n_{eff}$ of the first thin-film layer 200 is about 1.225 as described above. For example, the first thin-film layer 200 may be formed to have an average refractive index $n_{eff}$ in a range of about 1.213 to about 1.237. The concavo-convex pattern 210 uniformly protrudes from the first thin-film layer 200, so that an average refractive index of the first thin-film layer 200 with respect to incident light is decreased. Thus, reflection of incident light is decreased and the amount of light passing through the LGP 100 is increased. As a result, a total light transmittance is increased, and an efficiency is enhanced.

According to an exemplary embodiment, the first thin-film layer 200 includes colloidal silica ($SiO_2$). While forming the first thin-film layer 200, a light-curing process is performed so that the first thin-film layer 200 may include colloidal silica ($SiO_2$) having a light-curable property. For example, the first thin-film layer 200 may include colloidal silica ($SiO_2$) containing acrylate, for example, such as acrylate oligomer, ally methacrylate, and acrylate ester. When the first thin-film layer 200 includes colloidal silica ($SiO_2$), a refractive index corresponds to about 1.4. When a thickness of the first thin-film layer 200 is $\lambda/4$, the thickness of the first thin-film layer 200 is about 110 nm to about 170 nm with respect to visible light. To obtain an average refractive index of 1.225 under the conditions of the first thin-film layer 200, a period of the concavo-convex pattern 210 may be obtained by the following Equation 7. According to an embodiment, it is assumed that the concavo-convex pattern 210 of the first thin-film layer 200 has a sine wave shape.

$$A < \frac{\lambda}{n_0 \sin\theta_0 \cos\phi + (n_R^2 - n_0^2 \sin^2\phi)^{\frac{1}{2}}} \quad \text{[Equation 7]}$$

Here, A is a period of the concavo-convex pattern 210, $\lambda$ is a wavelength of incident light, $\theta$ is an incident angle of the incident light, and $\Phi$ is an azimuth angle of the incident light, $n_0$ is a refractive index of air, and $n_R$ is a refractive index of a thin-film layer.

According to Equation 7, when the concavo-convex pattern 210 has a sine wave shape and a period of the concavo-convex pattern 210 corresponds to about 200 nm to about 300 nm, an average refractive index of the first thin-film layer 200 is about 1.225.

It has been described that the concavo-convex pattern has a sine wave shape for simplicity of Equation 7. However, the embodiments of the present invention are not limited thereto. Even if the concavo-convex pattern 210 has a different form, an average refractive index may be adjusted by changing a period of the concavo-convex pattern 210.

When the period of the concavo-convex pattern 210 is about 200 nm to about 300 nm, the average refractive index of the first thin-film layer 200 may be about 1.225.

Figure 4:
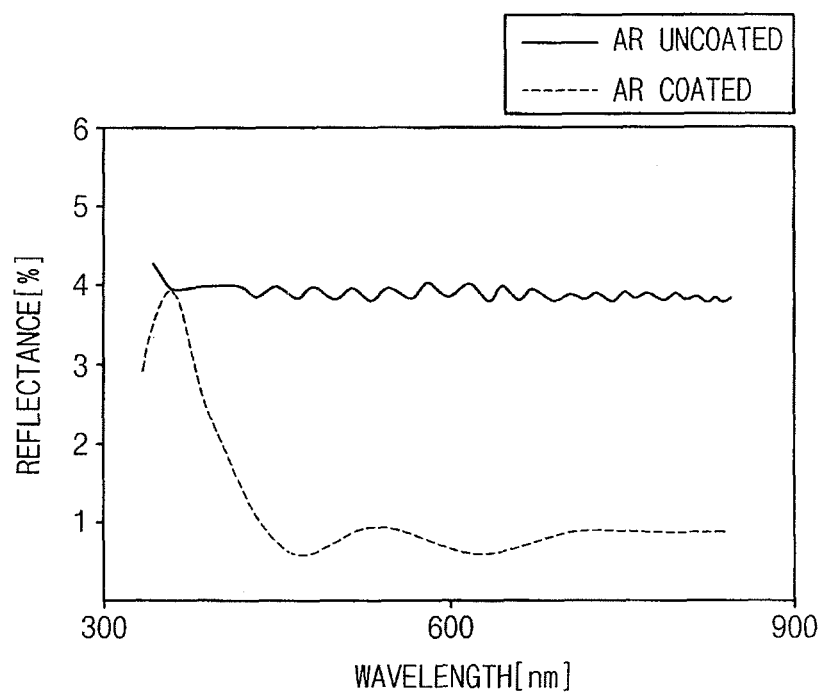
FIG. 4 is a graph showing a relationship between a reflectance for incident light of the light-guide module of FIG. 2 and a reflectance for incident light of a conventional light-guide plate ("LGP")

FIG. 4 is a graph showing a comparison in reflectance of incident light between the light-guide module 10 of FIG. 2 and a light-guide module that does not have the first thin-film layer 200.

Referring to FIG. 4, when the first thin-film layer 200 is formed on the LGP 100, light reflection is enhanced compared to when the first thin-film layer 200 is not formed on the LGP. When the first thin-film layer 200 has the concavo-convex pattern 210, reflectance of incident light is lower by about 3% to about 4% than when the first thin-film layer 200 is not formed on the LGP in a wavelength range of about 400 nm to about 600 nm included in a wavelength range corresponding to visible light. Light transmittance is enhanced by about 3.8% compared to when the thin-film layer 200 is not formed on the LGP 100.

Figure 5:
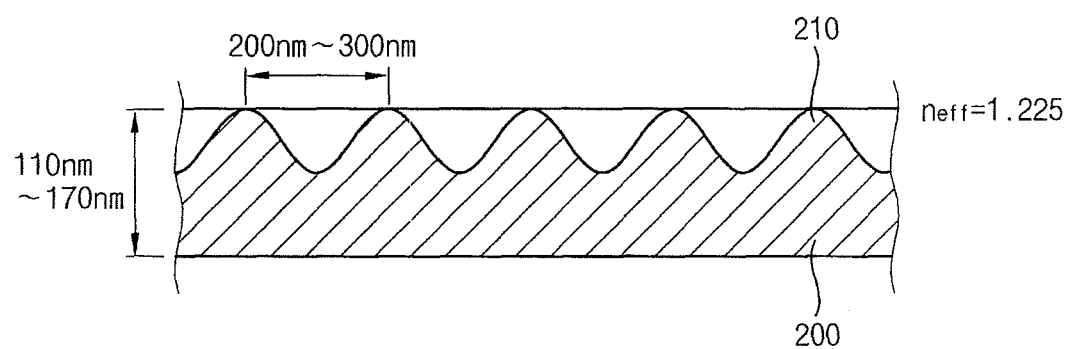
FIG. 5 is an enlarged cross-sectional view taken along a line I-I' of FIG. 2.

FIG. 5 is an enlarged cross-sectional view taken along a line I-I' of FIG. 2.

Referring to FIGS. 2 and 5, the concavo-convex pattern 210 has a plurality of protruding portions that have the same shape and height. According to embodiments, the concavo-convex pattern 210 may have protruding portions with the same shape and height or the protruding portions may have different shapes or heights. A cross-sectional surface of the concavo-convex pattern 210 has a sine wave shape. The first thin-film layer 200 may have a reduced average refractive index due to the concavo-convex pattern 210. Since the concavo-convex pattern 210 is formed on the first thin-film layer 210, the average refractive index $n_{eff}$ of the first thin-film layer 200 is substantially smaller than the refractive index $n_R$ of the first thin-film layer 200 where the concavo-convex pattern 210 is not formed on the first thin-film layer 200. According to an embodiment, the average refractive index $n_{eff}$ is about 1.225. For example, according to an embodiment, the first thin-film layer 200 may be formed so the average refractive index $n_{eff}$ has a range of about 1.213 to about 1.237.

According to an exemplary embodiment, a cross sectional surface of the protruding portions of the concavo-convex pattern 210 may have various shapes, such as a hemisphere shape, and an ellipse shape and may have different heights. According to an embodiment, the period of the concavo-convex pattern 210 may be varied, so that the average refractive index may be adjusted.

Figure 6:
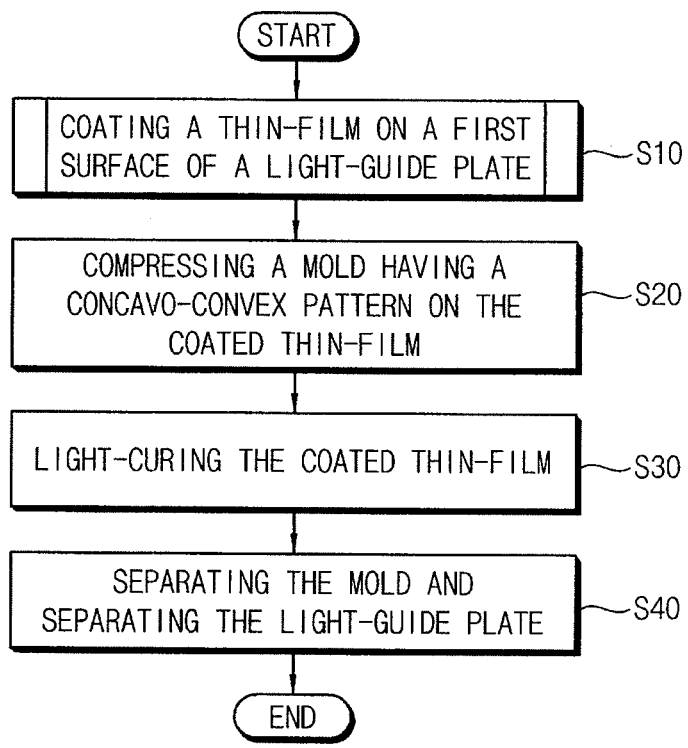
FIG. 6 is a flowchart showing a manufacturing method of the light-guide module of FIG. 2.
Figure 7:
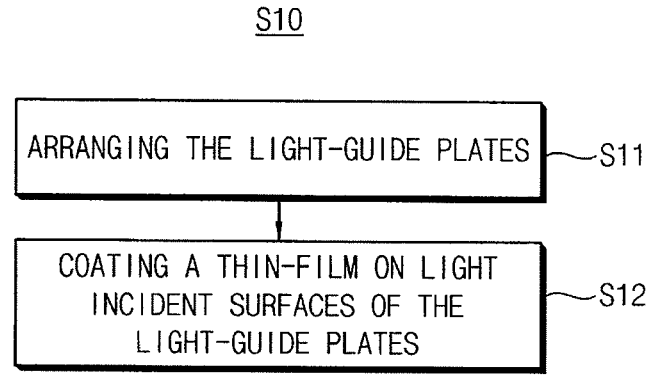
FIG. 7 is a flowchart showing steps of coating a thin-film on a light-incident surface of an LGP in the manufacturing method of FIG. 6.
Figure 8A:
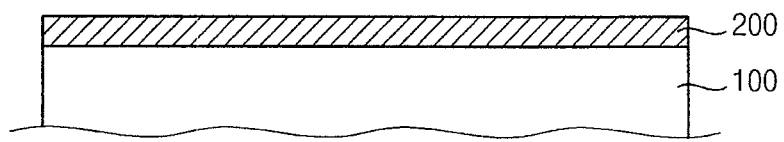
FIGS. 8A to 8C are cross-sectional views showing a manufacturing method of the light-guide module of FIG. 2.
Figure 8B:
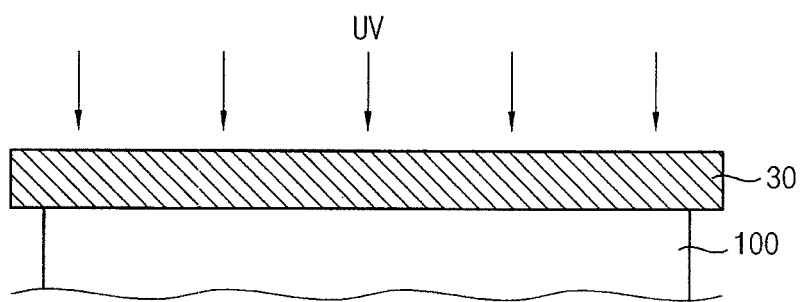
Figure 8C:
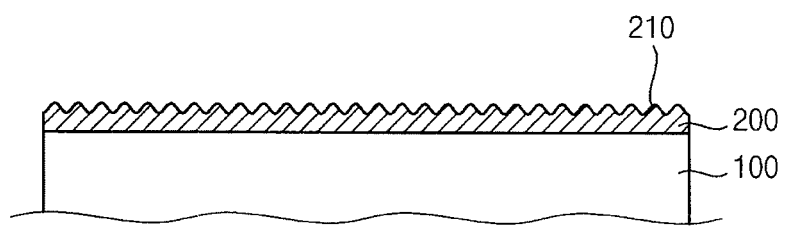
Figure 9:
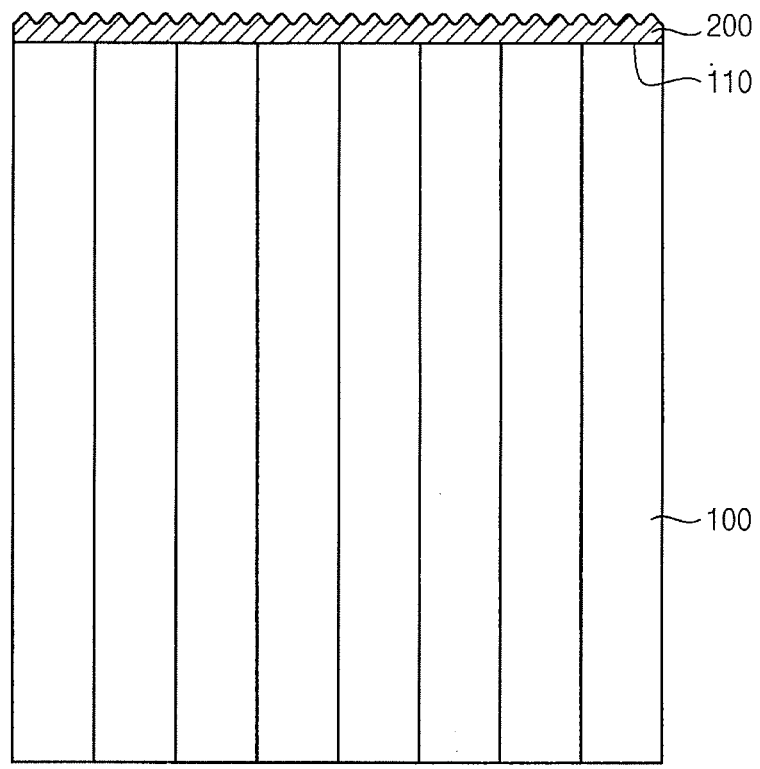
FIG. 9 is a plan view showing a step of arranging a plurality of LGPs in the manufacturing method of FIG. 7.

FIG. 6 is a flowchart showing a manufacturing method of the light-guide module 10 of FIG. 2. FIG. 7 is a flowchart showing a method of coating a thin-film on a light-incident surface of the LGP 100 in the manufacturing method of FIG. 6. FIGS. 8A to 8C are cross-sectional views showing a manufacturing method of the light-guide module 10 of FIG. 2. FIG. 9 is a plan view showing a method of arranging a plurality of LGPs in the manufacturing method of FIG. 7.

Referring to FIGS. 6 and 8, the LGP 100 is disposed so that a surface of the LGP 100 faces upward, and then a material for a thin-film layer is coated on the surface (step S10). The first thin-film layer 200 includes colloidal silica ($SiO_2$) having a light-curable property. For example, according to an embodiment, the first thin-film layer 200 may comprise colloidal silica ($SiO_2$) including acrylate, for example, such as acrylate oligomer, ally methacrylate, or acrylate ester.

A mold 30 having a pattern corresponding to the concavo-convex pattern 210 is prepared. The concavo-convex pattern 210 has a plurality of protruding portions that are repeated in a period of about 200 nm to about 300 nm. A cross-section surface of the protruding portions has a sine wave shape. The mold is compressed on an upper portion of the coated first thin-film layer 200 (step S20).

The compressed thin-film layer 200 is formed to have a thickness of about 100 nm to about 170 nm. Then, a light-curing process is performed while the mold is compressed (step S30). As the light-curing process proceeds, the coated thin-film layer 200 is cured to have a shape corresponding to a pattern of the mold.

When the light-curing process is completed, the mold 30 is removed. After the mold is removed, the thin-film layer 200 is cut to correspond to a thickness of the LGP 100, and then the LGP 100 is separated (step S40).

The light-curing process is used to form the thin-film layer having a uniform concavo-convex pattern on the LGP 100.

When the surface of the LGP 100 on which the thin-film layer is formed is a light-incident surface of the LGP 100, a step for arranging plural LGPs may be further performed while the thin-film layer 200 is formed on the light-incident surface of the LGP 100.

Referring to FIGS. 6 to 9, a plurality of LGPs 100 are arranged so that light-exiting surfaces 110 of the LGPs 100 are in parallel with each other. When the LGPs 100 are arranged, light-incident surfaces 110 of the LGPs are arranged toward an identical direction.

The LGPs 100 are disposed such that light-incident surfaces 110 of the LGPs 100 face upward (step S11). A thin-film layer is coated on the light-incident surfaces 110 (step S12). Steps after the thin-film layer is coated on the light-incident surfaces 110 are substantially the same as steps S20 to S40 of forming the thin-film layer on a surface of the LGP described with reference to FIGS. 6 and 8.

Accordingly, a thin-film layer having a uniform concavo-convex pattern is formed by performing a light-curing process on a plurality of LGPs, so that a plurality of light-guide modules may be manufactured in one process.

Figure 10:
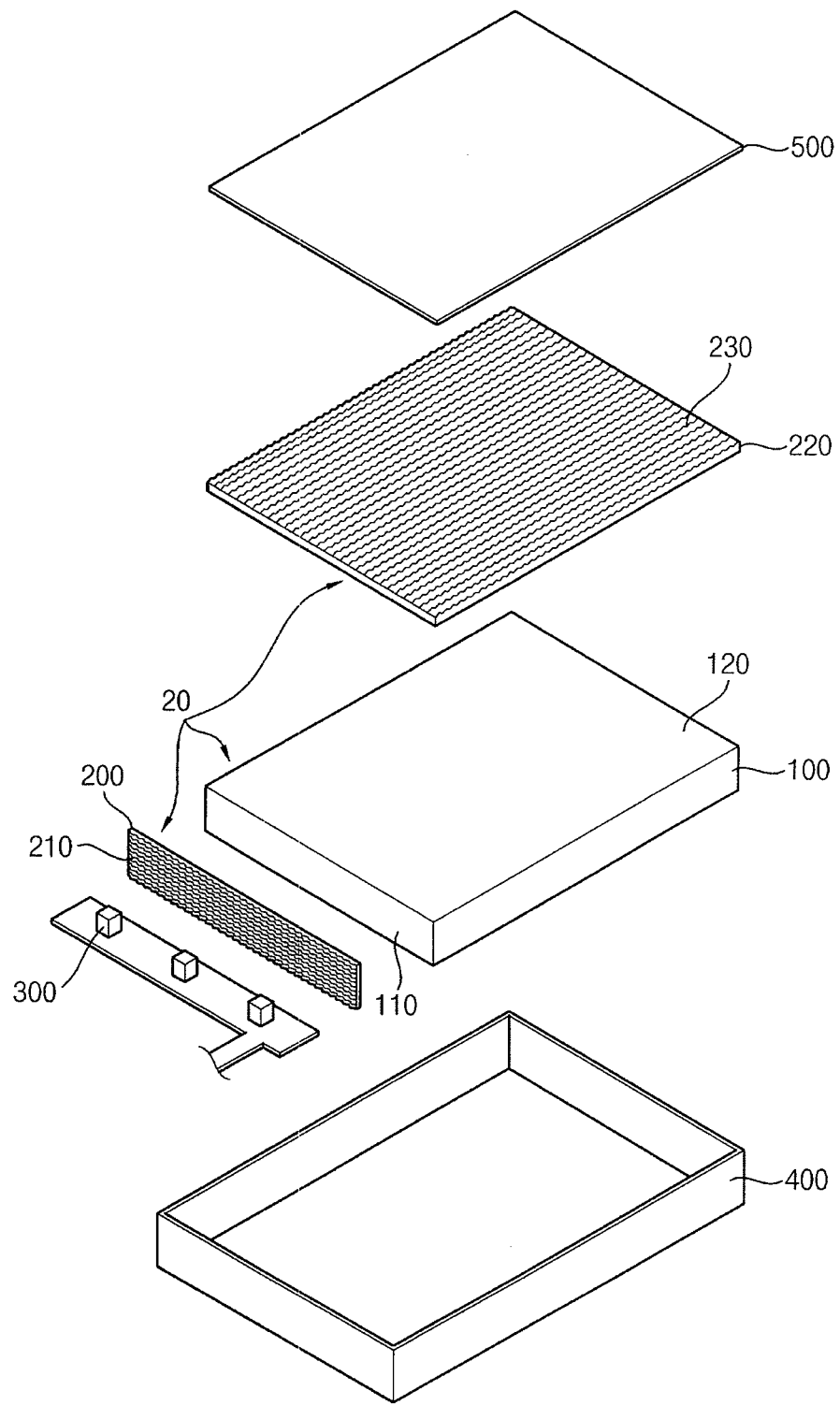
FIG. 10 is an exploded perspective view schematically showing a backlight assembly according to an exemplary embodiment of the present invention.
Figure 11:
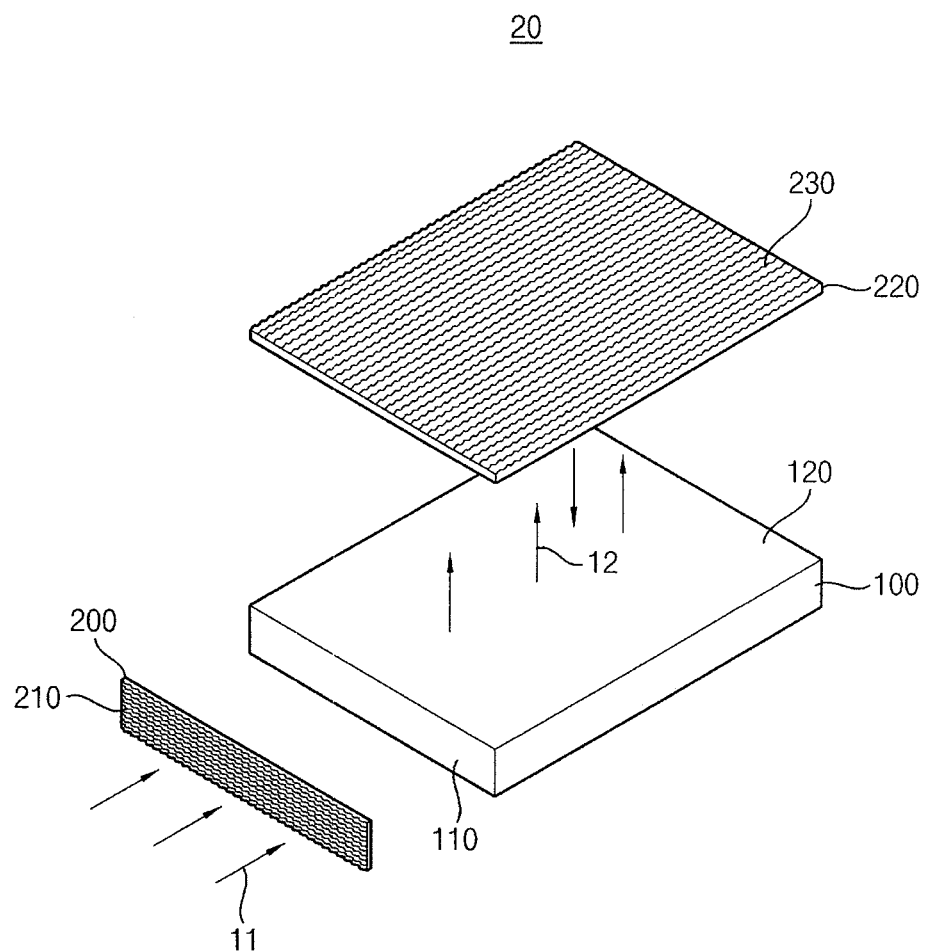
FIG. 11 is an exploded perspective view schematically showing a light-guide module of FIG. 10.

FIG. 10 is an exploded perspective view schematically showing a backlight assembly according to an exemplary embodiment of the present invention. FIG. 11 is an exploded perspective view schematically showing the light-guide module of FIG. 10.

Referring to FIGS. 1, 2, 10 and 11, a backlight assembly according to an exemplary embodiment of the present invention includes a light source 300, a light-guide module 20, and a receiving container 400. The light-guide module 20 includes an LGP 100, a first thin-film layer 200 formed on a light-incident surface of the LGP 100, and a second thin-film layer 220 formed on a light-exiting surface of the LGP 100. The backlight assembly further includes an optical sheet(s) 500. According to an embodiment, a plurality of optical sheets may be provided. The backlight assembly shown in FIGS. 10 and 11 is substantially the same as the backlight assembly shown in FIG. 1 except that the second thin-film layer 220 is formed on the light-exiting surface of the LGP 100.

The LGP 100 includes a light-incident surface 110 and a light-exiting surface 120. The light-incident surface 110 is formed on a first side of the LGP 100. The light-exiting surface 120 is extended from an upper side of the light-incident surface 110. For example, according to an embodiment, the light-exiting surface 120 is substantially perpendicular to the light-incident surface 110. The light-exiting surface 120 is an upper surface of the LGP 100. The light-exiting surface 120 faces a display panel (not shown). Light incident through the light-incident surface 110 exits out of the LGP 100 through the light-exiting surface 120.

The first thin-film layer 200 is formed on the light-incident surface 110 of the LGP 100. The second thin-film layer 220 is formed on the light-exiting surface 120 of the LGP 100. The second thin-film layer 220 is substantially the same as the first thin-film layer 200 of FIG. 2.

As described above in connection with the light-guide module 10 of FIG. 2, when light beams exit from the LGP 100, some light beams are reflected by a light-exiting surface 120 of the LGP 100 and some light beams are reflected by an upper surface of the second thin-film layer 220 to constructively or destructively interfere with each other depending on phases and periods thereof. The reflected light beams destructively interfere with each other to cancel each other out. Accordingly, total reflectance of the light beams exiting from the LGP 100 may be decreased. Interference between the reflected light beams and light beams newly exiting from the LGP 100 is also reduced. As a consequence, light transmittance of the light-guide module 20 is increased.

In the case of the second thin-film layer 220, a light beam exiting from the LGP 100 passes through the second thin-film layer 220, and in the case of the first thin-film layer 210, a light beam exiting from the first thin-film layer 210 passes through the LGP 100. Accordingly, a reflection coefficient 'A' obtained by Equation 1 with respect to the second thin-film layer 220 has an opposite sign from a sign of a reflection coefficient obtained with respect to the first thin-film layer 200. For example, the reflection coefficient A obtained with respect to the second thin-film layer 220 may have a negative value when the reflection coefficient has a positive value for the first thin-film layer 200. However, since light reflectance and light transmittance are obtained by $A^2$, there is no substantial difference in resultant reflectance and transmittance values. Thus, the second thin-film layer 220 may enhance light transmittance like the first thin-film layer 200.

The second thin-film layer 220 has a concavo-convex pattern 230 on an opposite surface from a surface contacting the LGP 100. According to an embodiment, an average refractive index $n_{eff}$ of the second thin-film layer 220 may be about 1.225. For example, according to an embodiment, the first thin-film layer 200 may be formed to have an average refractive index $n_{eff}$ in a range of about 1.213 to about 1.237. The concavo-convex pattern 230 uniformly protrudes from the second thin-film layer 220. According to an embodiment, a cross-sectional surface of the concavo-convex pattern 230 may have a sine wave shape. The protruding shape may decrease an average refractive index of the second thin-film layer 230. Reflection of light exiting from the LGP 100 is decreased due to the second thin-film layer 220 having a decreased average refractive index, and the amount of light exiting from the LGP 100 is increased. As a result, a total light transmittance is increased, and an efficiency is enhanced.

Thus, the amount of light passing through the light-incident surface and the light-exiting surface may be increased. As a consequence, a total light efficiency is enhanced, thus increasing luminance of light exiting from the light-exiting surface.

As described above, according to the exemplary embodiments of the present invention, a thin-film layer having a concavo-convex pattern is formed on a light-incident surface of an LGP, so that reflectance of light incident into the LGP may be decreased. The amount of light passing through the LGP is increased due to the reduced reflectance, thus increasing a total light transmittance. As a result, a light transmittance efficiency of light is enhanced, and luminance characteristics of a backlight assembly are enhanced.

Even though it has been described that the first and second thin-film layers 200 and 220 are separately provided from the LGP 100, the embodiments of the present invention are not limited thereto. According to an embodiment, the concavo-convex patterns 210 and 230 may be directly formed on the light-incident surface and the light-exiting surface of the LGP 100, respectively, to have the same effects as those achievable by the first and second thin-film layers 200 and 220.

The foregoing is illustrative of the embodiments of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims.

What is claimed is:

1. A light-guide module comprising:
    a light-guide plate ("LGP") comprising a light-incident surface into which light is incident and a light-exiting surface through which light exits; and
    a thin-film layer on the LGP, the thin-film layer having a first surface contacting the LGP and a second surface opposite to the first surface, wherein a concavo-convex pattern is formed on the second surface of the thin-film layer, wherein a refractive index of the thin-film layer is smaller than a refractive index of the LGP, wherein the thin-film layer is positioned between the LGP and a plurality of light sources, and wherein the thin-film layer includes light-curable colloidal silica including acrylate, and wherein a period of the concavo-convex pattern satisfies the following equation:

$$A < \frac{\lambda}{n_0 \sin\theta_0 \cos\phi + (n_R^2 - n_0^2 \sin^2\phi)^{\frac{1}{2}}}$$

wherein A is the period of the concavo-convex pattern, $\lambda$ is a wavelength of incident light, $\theta$ is an incident angle of the incident light, and $\phi$ is an azimuth angle of the incident light, $n_0$ is a refractive index of air, and $n_R$ is the refractive index of the thin-film layer.

2. The light-guide module of claim 1, wherein a cross-section of the concavo-convex pattern is a sine wave shape that has a period of about 200 nm to about 300 nm.

3. The light-guide module of claim 2, wherein the thin-film layer has an average refractive index of about 1.22 to about 1.23, and has a thickness of about 110 nm to about 170 nm.

4. The light-guide module of claim 2, wherein the thin-film layer is formed on the light-incident surface.

5. The light-guide module of claim 2, wherein the thin-film layer is formed on the light-incident surface and the light-exiting surface.

6. The light-guide module of claim 5, wherein the light-exiting surface is extended from the light-incident surface, and is substantially perpendicular to the light-incident surface.

7. The light-guide module of claim 1, wherein the thickness of the thin-film layer is $\lambda/4$, and wherein $\lambda$ is a wavelength of the incident light.

8. The light-guide module of claim 1, wherein the plurality of light sources are aligned along the second surface of the thin-film layer.

9. The light-guide module of claim 1, wherein the thin-film layer is a colloidal silica layer with a predetermined thickness.

* * * * *